Dec. 6, 1955   D. G. MOORE   2,726,367
MEASUREMENT OF PHASE MODULATION
Filed May 7, 1953   2 Sheets-Sheet 1
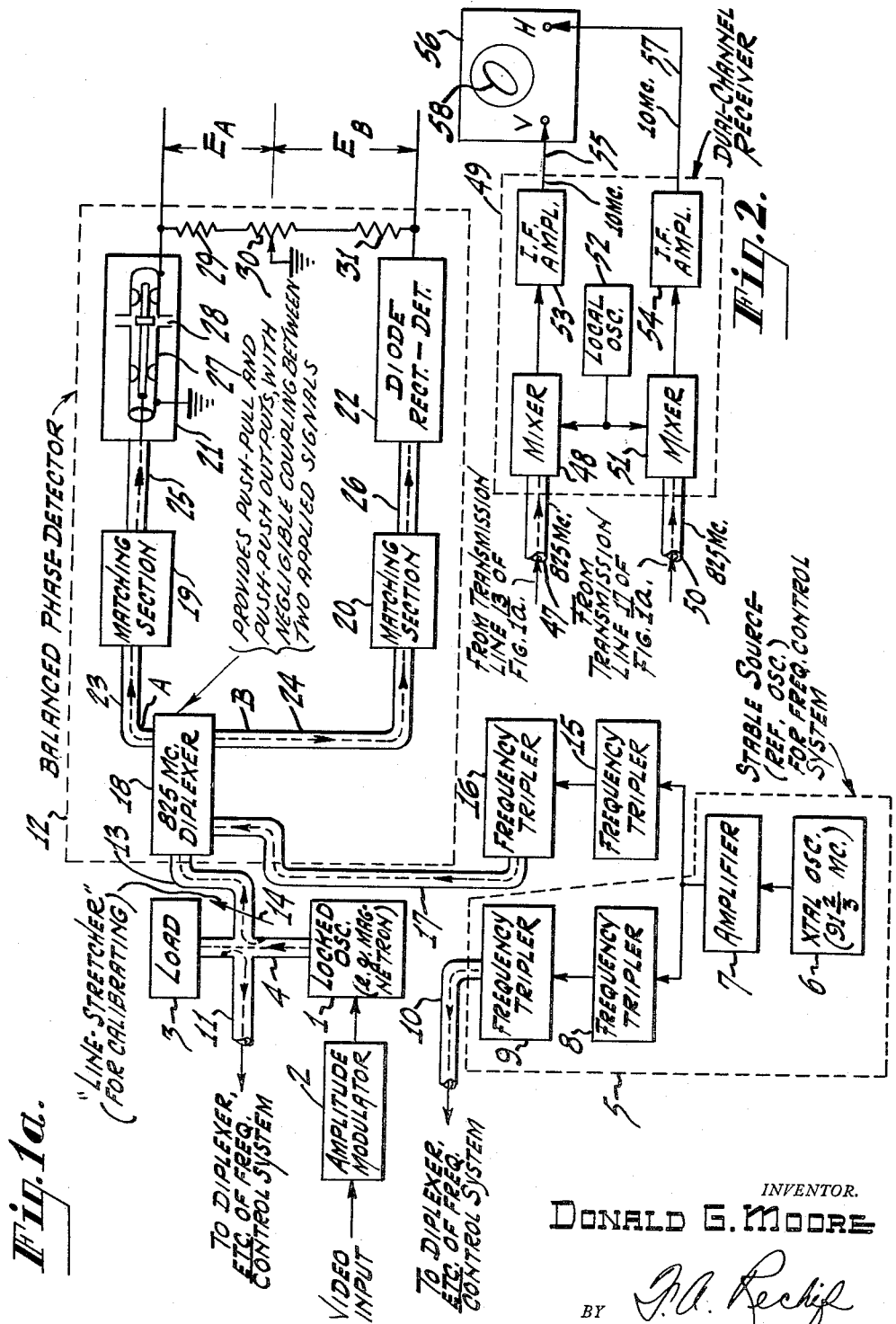
INVENTOR.
DONALD G. MOORE
BY *[signature]*
AGENT

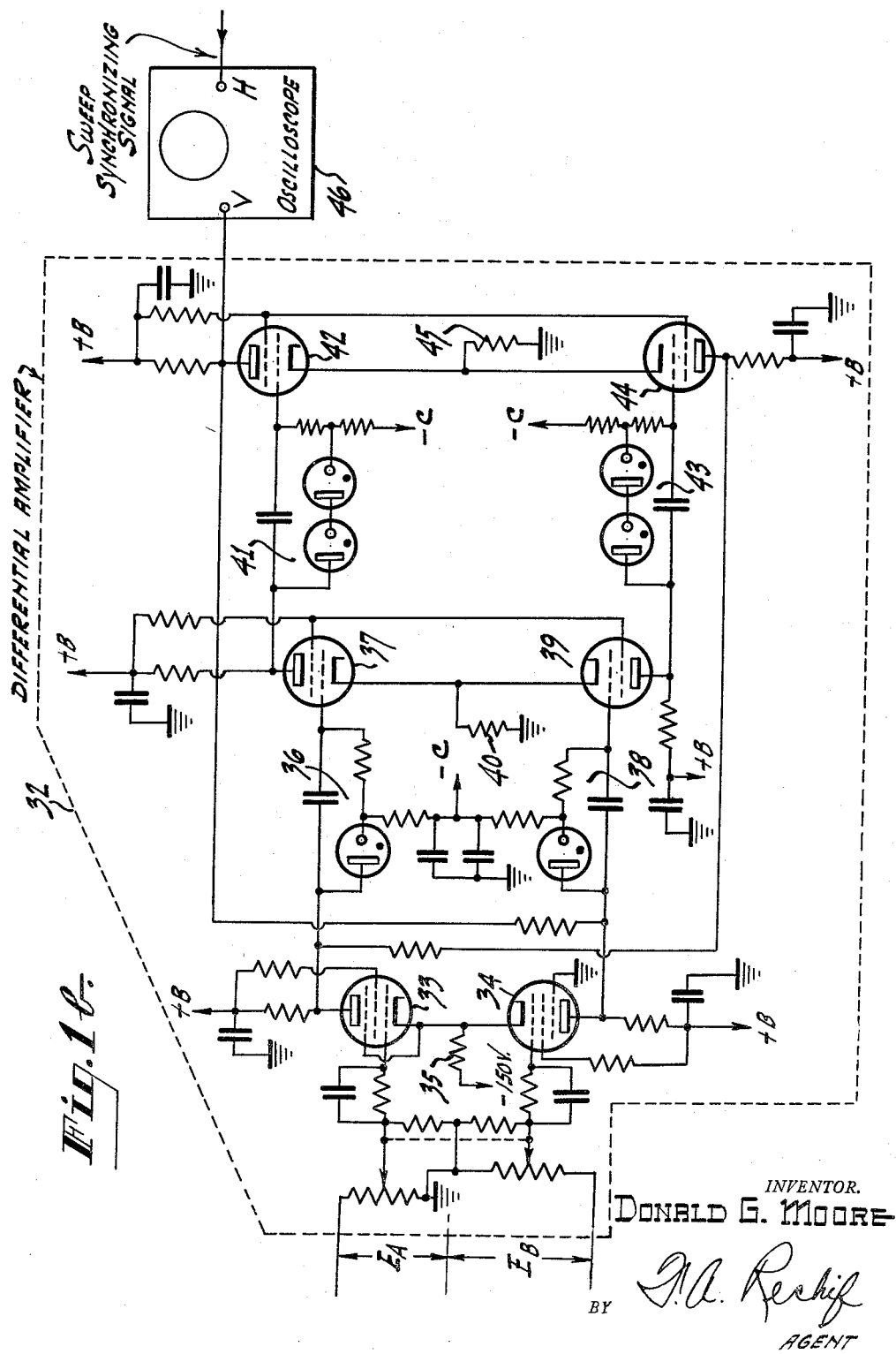

United States Patent Office 2,726,367
Patented Dec. 6, 1955

2,726,367

MEASUREMENT OF PHASE MODULATION

Donald G. Moore, Princeton, N. J., assignor to Radio Corporation of America, a corporation of Delaware Application May 7, 1953, Serial No. 353,652

3 Claims. (Cl. 332—39)

This invention relates to the measurement of phase modulation, and more particularly to the measurement of small amounts of phase modulation in the presence of large amounts of amplitude modulation, such as may exist in television transmitters.

Incidental phase modulation in amplitude modulated signals is an important factor in many types of transmission, one of these types being standard VHF television transmission. Also, it has been found that, for many types of transmitters, as the carrier frequency is increased the amount of incidental phase modulation also increases; therefore, in the newly-opened U. H. F. region the larger amount of phase modulation may become a much more serious problem than generally exists at VHF. Of importance are not only audio effects, such as interference arising because of phase modulation in intercarrier-sound receivers, but also effects on picture quality, taking into account all the video frequencies. These latter effects arise from the fact that the phase modulation produces an additional signal in the receiver in the single sideband region of the vestigial sideband transmission.

In view of the aforementioned undesirable effects produced by residual phase modulation in an amplitude modulated television signal, such phase modulation must be measured or monitored. There are other cases where it would be desirable to measure the relative phase of two signals where both may be varying in phase with time, where one may be fixed in phase, or where both may be fixed in phase. The rate of change of relative or absolute phase may vary from zero frequency to high video frequencies.

Accordingly, an object of this invention is to devise a novel system for measuring the relative phase of one signal with respect to another.

Another object is to provide a system for measuring the relative phase of one signal with respect to another, which system will function effectively even though one signal is varying in amplitude.

A further object is to devise a system for measuring the relative phase of a signal, where such relative phase may be varying at any rate from zero frequency to high video frequencies.

The objects of this invention are accomplished, briefly, in the following manner: A portion of the output of the signal source the phase modulation of which is to be measured, for example an amplitude modulated transmitter, is fed into one input of a balanced phase detector to the other input of which is fed a reference signal derived from the frequency controlling source for the transmitter. The differential output of the balanced phase detector is amplified and fed to a voltage indicating device such as an oscilloscope. The output of the balanced phase detector and, if they have flat response down to D. C., the amplifier and voltage indicating device are calibrated to indicate relative phase deviation, by static means. Once the output of the phase detector (and the voltage indicating device) has been calibrated to indicate phase deviation, the phase modulation during amplitude modulation of the transmitter may be measured or monitored.

The invention will be best understood from the following description of an exemplification thereof, reference being had to the accompanying drawings, wherein:

Fig. 1 (composed of Figs. 1a and 1b on separate sheets) is a schematic diagram, partly in detail and partly in block form, of the invention in use to measure the phase modulation of an amplitude modulated oscillator; and Fig. 2 is a block diagram of the calibrating equipment used for the measuring system of Fig. 1.

Referring now to Fig. 1, the locked oscillator 1 the phase modulation of which is to be measured by the system of this invention may be, for example, a magnetron which is amplitude modulated in response to video input signals by means of an amplitude modulator 2 suitably coupled to such magnetron. The output of magnetron 1 is fed to a suitable load 3 by means of a transmission line 4, which is preferably a coaxial line, as illustrated. The magnetron 1 may operate at 825 mc., for example, and in order to automatically control or stabilize the magnetron output frequency, the equipment within the dotted-line enclosure 5 may be utilized. This equipment is a stable frequency source (a reference oscillator) for the magnetron frequency control system, and comprises a crystal oscillator 6 operating at 91⅔ mc., followed by an amplifier 7 and two frequency triplers 8 and 9, to provide a final output frequency of 825 mc. in coaxial line 10. The arrangement of the reference oscillator equipment 5 may thus be similar to that disclosed in my joint copending application, Serial No. 130,964, filed December 3, 1949, now Patent No. 2,676,260, dated April 20, 1954. The line 10 feeds this stable 825 mc. output frequency to a frequency control system for magnetron 1. This frequency control system may be of the type disclosed in said copending application, including a diplexer to which are applied the magnetron output frequency (derived by means of a line 11 coupled to line 4) and the reference output frequency from tripler 9 obtained by line 10, the diplexer providing push-push and push-pull outputs which are applied to the diode rectifiers of a balanced phase detector. The frequency control system includes also a differential amplifier to which are applied in differential fashion the outputs of the diode rectifiers, the output of this amplifier controlling, through suitable frequency-controlling means, the frequency of magnetron 1. The entire frequency control system described may be, as stated, of the type disclosed in said copending application.

Although the locked oscillator 1 has been described as being a magnetron, the invention is not at all limited thereto. It may instead be a power amplifier of any suitable type which is amplitude modulated by any suitable modulating signal. In the latter event, the equipment within the enclosure 5, instead of being used for frequency control purposes, would be used as the exciter for the power amplifier. Or, it may be desired to measure the phase modulation present in the outputs of still other types of modulated amplifiers.

According to this invention, a small portion of the RF output of the transmitter oscillator 1 is fed to one input of the balanced phase detector or phase discriminator 12 (shown within a dashed-line box), by means of a transmission line 13 coupled to transmission line 4 and having a "line-stretcher" 14 therein. A reference signal, having stable or fixed frequency and phase, is fed to the other input of detector 12 via line 17. This reference signal is derived from amplifier 7 in source 5 and is fed to frequency tripler 15 and then to frequency tripler 16 having an output frequency of 825 mc. Thus, the two signals used for phase comparison in detector 12 have the same nominal frequency. The transmission line 17, which may be a coaxial line, feeds the output of tripler 16 to phase detector 12. The reference signal is derived from a low-frequency stage of source 5 so that when the transmitter oscillator 1 is amplitude modulated the reference signal will be free from any pulling effects and will then be invariant in frequency and amplitude. In other words, the tripler stages 8 and 9 act as buffers to isolate the output of tripler 16 from any pulling effects which oscillator 1 might have on reference oscillator 5. This isolation of the reference signal from any pulling effects is of particular advantage when the amplitude modulated oscillatory energy source is a power amplifier and when, therefore, the source 5 is an exciter and when the output of tripler 9 is fed directly to an output stage (power amplifier).

An arrangement different from the one illustrated could alternatively be used, for deriving the reference signal fed to a diplexer 18 by means of a diplexer input line 17.

The balanced phase detector or phase discriminator 12 comprises a diplexer 18 operating at 825 mc., two matching sections 19 and 20, and two diode rectifier-detectors 21 and 22. These parts of the balanced phase detector 12 are substantially similar to corresponding parts comprising the balanced phase detector in the frequency control system of the aforementioned copending application and are described in considerable detail therein, with the exception that in the present invention it is possible to omit the high pass filters which are used in the frequency control system of the said copending application.

Transmission line 13 is connected to one input of diplexer 18 and serves to couple energy from the amplitude modulated oscillator 1 to such diplexer, as one of the two diplexer inputs. Line 13 has a "line-stretcher" 14 therein, between transmission line 4 and diplexer 18, as previously stated; this enables the phase of the input energy reaching the diplexer from oscillator 1 to be adjusted or varied for calibrating purposes, as will be explained hereinafter. Transmission line 17 is connected to the other input of diplexer 18 and serves to couple energy from the reference oscillator (through frequency multipliers 15 and 16) to such diplexer, as the other of the two diplexer inputs. Diplexer 18 serves to make the electrical coupling between the reference signal and amplitude modulated oscillator signal negligible, while at the same time providing push-pull (anti-phasal) and push-push (cophasal) inputs to the diode rectifier-detectors 21 and 22. The diplexer 18 may, for example, be of the type disclosed in Brown Patent #2,454,907, dated November 30, 1948, and also disclosed in the aforementioned copending application. There is a balancing device in this diplexer; this balancing device, called a balun, causes the signal from the transmitter oscillator 1 appearing at one of the two output leads or transmission lines 23 to be 180° out of phase (in push-pull) with the transmitter signal appearing at the other output lead or transmission line 24. The reference signal (from tripler 16), however, feeds the outputs 23 and 24 in parallel and hence in phase (push-push) with each other. The points A and B are assumed to be located, for the purposes of the following discussion, at the respective outputs of diplexer 18, point A being associated with diplexer output line 23 and point B being associated with diplexer output line 24.

There are alternative arrangements of the diplexer 18. For example, the diplexer 18 may be replaced by other types of hybrid junctions such as a ring type or a "magic T," as illustrated in Figs. 4 and 5, respectively, of said copending application.

Diplexer output line 23 applies output from diplexer 18 to an impedance matching section 19, while diplexer output line 24 applies output from said diplexer to an impedance matching section 20. The matching sections 19 and 20 are adjustable coaxial quarter-wave transformers or eccentric coaxial elements designed to match over a wider frequency range than 32–db. standing wave ratio presented by the diodes 21 and 22 and their holders. An adjustment is provided that controls the amount of eccentricity and provides for an excellent impedance match.

The output of matching section 19 is fed by means of a transmission line 25 to the diode rectifier-detector 21, while the output of matching section 20 is fed by means of a transmission line 26 to an exactly similar diode rectifier-detector 22. The diodes may be pencil type vacuum tube diodes, of developmental type R–6367–C and may be similar to those disclosed in the aforementioned copending application. Each diode is mounted in a holder 27 which has a built-in R. F. bypass condenser 28. The two diodes 21 and 22 have respective load resistors 29 (and an adjustable portion of 30) and 31 (and the remaining portion of 30). The resistor 30 is made adjustable over a small range to afford final balance of the two diode outputs $E_A$ and $E_B$; in addition, the heater voltage of one diode may be made adjustable to complete this balancing. The two outputs of the balanced phase detector 12 (i. e., $E_A$, from diode 21 to ground and $E_B$, from diode 22 to ground) are fed to a differential amplifier 32, which amplifies the differential or push-pull signal and rejects the push-pull signal. Thus, the detector output is double-ended or balanced with respect to ground.

To better understand the operation of the invention so far described, let us first consider the over-simplified case of a transmitter producing phase modulation but no amplitude modulation. Let us adjust the transmitter signal (from oscillator 1) and the reference signal (from tripler 16) so they are of the same amplitude, and examine the operation for various static relative phase relationships between the two signals. If the transmitter signal is in phase with the reference signal and of the same amplitude, the two signals present at A will be in phase and will add, while the two signals at B will be 180° out of phase and will cancel each other. In this connection, it will be recalled that the diplexer 18 operates to provide push-push (cophasal) signals at locations A and B from the reference signal and push-pull (antiphasal) signals at A and B from the transmitter signal. The diode detector 21 connected to A will rectify the R. F. voltage and develop a D. C. voltage $E_A$ across its load resistor. The diode detector 22 connected to B will have no D. C. voltage across its load ($E_B=0$), since for this diode the R. F. voltage is zero. If the R. F. phase of the transmitter signal is changed by 180° with respect to the reference signal, then $E_A=0$ and $E_B$ will be maximum. Finally, if the transmitter signal is 90° out of phase with the reference signal, the magnitude of the combined R. F. voltages at A will equal the magnitude of the combined R. F. voltages at B. The D. C. voltages across the diode load resistors 29, 30, 31 will then be equal, since they are simply a measure of the magnitudes of the R. F. voltages presented to the diodes, without regard to the R. F. phase. In other words, $E_A=E_B$ for this particular condition.

As previously stated, the outputs of the phase detector are connected to a differential amplifier 32. The amplifier disregards the actual values of $E_A$ and $E_B$, but gives an output proportional to the difference between them $(E_A-E_B)$. For the case where the transmitter and reference signals are in phase and of equal amplitude, the amplifier output is proportional to $E_A$. For 90° out of phase the output is zero, and for 180° out of phase the output is proportional to $-E_B$. In other words, the net output of the balanced phase detector 12 is proportional to the departure from quadrature of the signals in lines 13 and 17, the inputs to such detector.

If desired, in the overall system a fixed phase shift (such as an extra length of transmission line) may be added in one of the lines 13 or 17, in order to cause zero output of the differential amplifier 32 to correspond to zero phase angle between the transmitter and reference signals, instead of 90°. The maximum negative voltage output, then, corresponds to —90° and the maximum positive voltage to +90°. Of course, the polarity of the voltage for a given sign of phase angle is arbitrary.

In another case, still over-simplified by assuming no amplitude modulation, let us adjust the signal levels so that the R. F. voltage of the reference signal is less than the R. F. voltage of the transmitter signal. If these two signals are in phase (in the system with no added phase shift) they will add at A and subtract at B, making $E_A$ somewhat larger than $E_B$ ($E_B$ not being zero in this case due to the unequal signal levels). The output of the differential amplifier 32 will be $(E_A-E_B)$ times the gain of the amplifier and will be a positive voltage. When the transmitter and reference signals are 90° out of phase, the R. F. signal at A will be equal to the R. F. signal at B, and the output of the amplifier 32 will be zero. When the transmitter and reference signals are 180° out of phase, $E_A$ will be less than $E_B$ and the output of the amplifier will then be negative.

In the arrangement indicated in Fig. 1, an objective is to measure the incidental or residual phase modulation of the locked oscillator 1, as a result of amplitude modulation of the oscillator. The reference signal is derived from the crystal oscillator 6 and is invariant, while the unknown (transmitter) signal is varying in phase and amplitude. Therefore, the case which actually confronts us is one in which the transmitter is amplitude modulated. We are therefore interested in producing a voltage proportional to the phase modulation present, while ignoring the amplitude modulation. As in the previous case, let us adjust the levels so that the R. F. voltage from the reference oscillator is less than that from the transmitter. Let us make the ratio such that the reference voltage is always less than the transmitter voltage, even at the lowest points on the modulation cycle (this being impossible, of course, for the limiting case of 100% modulation). If the two R. F. signals are in phase they will add at A and subtract at B, just as before. The difference between $E_A$ and $E_B$, for this condition, is proportional to the smaller of the two R. F. signals and is independent of the larger one. For the case of 180° out of phase, a similar situation exists, except that $E_B$ is larger than $E_A$. When the two signals are 90° out of phase, $E_A=E_B$, regardless of the R. F. amplitudes. This means that for these particular phase angles (0°, 90° and 180°) the output of the differential amplifier is independent of the amplitude of the transmitter signal, provided it is always greater than the reference signal. Even though this independence of amplitude does not hold strictly true for phase angles between 0°, 90°, and 180°, the error can be made to approach zero if the ratio of transmitter signal to reference signal is made sufficiently high. The effective limiting (elimination of the amplitude modulation) is essentially perfect if the transmitter signal is more than ten times the reference signal, at the lowest part of the modulation cycle. These errors caused by changes in the phase discriminator characteristic due to amplitude modulation of the transmitter signal will still be small if the ratio between transmitter signal and reference signal is always greater than 2:1. Thus, one of the important objects of this invention has been accomplished. If the amplitude of the reference signal is always maintained at a level sufficiently lower than that of the amplitude modulated (transmitter) signal, the output of the differential amplifier 32 is proportional to phase deviation and is substantially independent of amplitude modulation. This permits the measurement of small amounts of phase modulation, even in the presence of large amounts of amplitude modulation.

From the foregoing, it will be realized that the output of the phase detector 12 at any one moment is a unidirectional or D. C. voltage, but this voltage may change polarity as the relative phase of the transmitter signal reverses and may also vary in amplitude at a video rate as the phase modulation of the transmitter signal varies. Thus, the phase detector output may be thought of as a varying D. C. voltage.

It is fairly important that the two diodes be balanced. The mechanism that makes the balance of the diodes important is not particularly complex. Under dynamic conditions the differential amplifier 32 produces an output proportional to the differential or push-pull voltage appearing at the diode outputs and ignores the push-push signal caused by the amplitude modulation. If there were only amplitude modulation present and the diodes were unbalanced, there would be a push-pull voltage developed, as well as the push-push signal, and this would give a false output. Where there is perfect balance and also given amounts of phase modulation and amplitude modulation, the ratio of push-push (undesired) signal to push-pull signal will be greatest when the ratio of transmitter signal to reference signal is greatest. It is clear, then, that a small percentage of unbalance may be important when there is deep amplitude modulation and a high ratio of transmitter signal to reference signal. In addition to the balancing control on resistor 30, the matching sections 19 and 20 for each diode should be adjusted carefully to insure equal coupling of the diodes to the R. F. lines over a broad frequency range, if measurements are to be made at high video frequencies. In practice, and as previously stated, it was found helpful in effecting a balance to make the heater voltage of one diode slightly variable, to compensate for slight differences in emission between the two diodes.

As previously described, the output voltages $E_A$ and $E_B$ of the balanced phase detector 12 are applied to the differential amplifier 32, which includes a plurality of cascaded (and paired) amplifying stages, the couplings between the tubes in each of the two cascades being capable of passing direct current and each respective pair of tubes having a large unbypassed common cathode resistor which provides degeneration of push-push or cophasal signals applied to the tubes of the pair. Thus, $E_A$ is applied to the control grid of the first tube 33, while $E_B$ is applied to the control grid of the first "paired" tube 34, tubes 33 and 34 having a common cathode resistor 35. The output of tube 33 is applied through a coupling 36 capable of passing direct current to the input of the following tube 37, while the output of tube 34 is applied through a coupling 38 capable of passing direct current to the input of the following tube 39. Tubes 37 and 39 have a common cathode resistor 40. The output of tube 37 is applied through a coupling 41 capable of passing direct current to the input of the following tube 42, while the output of tube 39 is applied through a coupling 43 capable of passing direct current to the input of the following tube 44. Tubes 42 and 44 have a common cathode resistor 45. Negative feedback is effected from the output circuit of tube 42 to the output circuit of tube 34, while negative feedback is effected from the output circuit of tube 44 to the output circuit of tube 33. By means of the connections described, the differential amplifier 32 produces an output proportional to the differential or push-pull voltage appearing at the outputs of the diodes 21 and 22, and ignores the push-push signal. In other words, the differential amplifier 32 amplifies the differential or push-pull signal and rejects the push-push signal.

The differential amplifier 32 is D. C. coupled and has a flat frequency response from D. C. to the highest frequency of interest, such as 5 mc. or 10 mc. The output of amplifier 32 is taken single-ended from the anode of tube 42 and is fed to a voltage indicating device such as an oscilloscope 46. Although an oscilloscope is illustrated, any other suitable form of voltage indicating device, such as an appropriate meter, can be used.

The oscilloscope 46 is D. C. coupled internally and should have a flat frequency response, from D. C. to the highest frequency of interest, which may lie in the video frequency range. An arrangement equivalent to amplifier 32 and oscilloscope 46 would comprise a D. C. oscilloscope with a differential amplifier having a frequency response from D. C. to a frequency such as 1 mc. (which oscilloscope would be used in the static calibration procedure, to be later described, and in low frequency measurements), and an A. C. oscilloscope with an A. C. differential amplifier having a flat frequency response from a frequency such as 100 kc. to the highest frequency of interest such as 5 mc. or 10 mc. (which oscilloscope could be calibrated dynamically against the low frequency equipment at any frequencies between 100 kc. and 1 mc.).

As illustrated, the output of amplifier 32 may be applied to the vertical deflection circuits of oscilloscope 46, while a suitable sweep synchronizing signal may be applied to the horizontal deflection circuits of the oscilloscope, in order to sweep the beam of the cathode ray oscilloscope horizontally as a function of time.

Among the various types of presentations on the oscilloscope, there may be mentioned the following. An approximate sine wave of phase modulation of the transmitter of ±30°, say, could be applied to the vertical deflection circuits of oscilloscope 46, with the sweep circuits adjusted to make visible, say, four complete cycles of this approximate sine wave. Another type might be the modulation of a transmitter by a composite television signal and the measurement of its residual phase modulation by the use of the system of this invention, with the sweep of the oscilloscope synchronized by the television synchronizing pulses. Still a third type would be the measurement of phase modulation of a transmitter over a video frequency spectrum by use of the equipment in conjunction with a video sweep generator, the sweep of the oscilloscope then being synchronzed with the sweep of the sweep generator which modulates the transmitter.

The output of the balanced phase detector 12 and, if they have flat response to D. C., the amplifier 32 and voltage indicator 46 also, may be calibrated to indicate relative phase deviation by static means, using certain auxiliary equipment illustrated in Fig. 2, now to be described. During calibration, the transmitter oscillator 1 is unmodulated. Referring now to Fig. 2, a branch transmission line 47 is coupled at one end to transmission line 13 at the output side of line stretcher 14 and at its other end to the first mixer 48 of a dual-channel receiver 49, in order to feed a portion of the 825-mc. transmitter locked oscillator signal from oscillator 1 to one input of said receiver, as well as to one input of phase detector 12. A branch transmission line 50 is coupled at one end to transmission line 17 and at its other end to the second mixer 51 of receiver 49, in order to feed a portion of the 825-mc. reference signal from tripler 16 to the other input of said receiver, as well as to the other input of phase detector 12.

The dual-channel receiver 49 has a single crystal-controlled local oscillator chain 52 which feeds the two identical crystal mixers 48 and 51. The difference frequency outputs of mixers 48 and 51 are amplified by two identical I. F. amplifier chains 53 and 54, respectively, tuned to the difference frequency of 10 mc. The 10-mc. output of amplifier 53 is fed by means of a connection 55 to the vertical input of a calibrating oscilloscope 56, while the 10-mc. output of amplifier 54 is fed by means of a connection 57 to the horizontal input of oscilloscope 56. The oscilloscope 56 has identical 10-mc.-wide horizontal and vertical amplifiers.

Thus, the same two signals which are fed into the balanced phase detector 12 are fed to the mixers 48 and 51 wherein the signals are heterodyned to a relatively low frequency of 10 mc., while preserving their relative phase relationship. If the mixers 48 and 51, the I. F. amplifiers 53 and 54, and the amplifiers in the oscilloscope 56 are identical, and if the R. F. transmission lines are identical, whatever static phase relationship exists between the unmodulated transmitter signal and the reference signal will exist between the two 10-mc. signals and will be displayed in the form of an ellipse (such as indicated at 58) on the oscilloscope 56. The relative phase of the two 10-mc. signals can be readily calculated from the configuration of ellipse 58, according to well-known principles. If the two channels of the dual-channel receiver 49 are not identical, the phase difference can be compensated for with an extra length of transmission line in one of the input signal leads 47 or 50.

For obtaining the calibration curve, means must be provided to vary, statically, the phase of the transmitter locked oscillator or power amplifier signal with respect to the reference signal. The adjustable line stretcher 14 in transmission line 13 will accomplish this. As the phase of the locked oscillator or power amplifier signal is varied statically by line stretcher 14, with respect to the reference signal, the D. C. output of the balanced phase detector 12 also changes, giving a changed D. C. output of the differential amplifier 32 and a changed deflection on the D. C. oscilloscope 46. The ellipse 58 on the calibrating oscilloscope 56 also changes, to indicate a different phase relationship. The points comprising the calibration curve (for the measuring equipment of Fig. 1) are established by recording, for various settings of line stretcher 14 (i. e., various phase angles between the transmitter signal and the reference signal), the D. C. output of the differential amplifier 32 or the D. C. deflection on oscilloscope 46, and calculating the corresponding phase angle from the shape of the ellipse 58 on the oscilloscope 56 at the output of the dual-channel receiver 49. These measurements and calculations are made statically (i. e., with no amplitude modulation of the transmitter oscillator 1). After calibration, the deflections on oscilloscope 46 for the various phase angles between the transmitter signal and the reference signal are known and a suitable scale for the oscilloscope using the calibration data may be made, whereby the phase deviation between the two input signals to phase detector 12 can be read directly from the face of the tube in oscilloscope 46. By applying a suitable sweep voltage to oscilloscope 46, as previously described, dynamic indications and measurements of the phase modulation of transmitter oscillator 1 may be made, utilizing the measuring equipment of Fig. 1.

A partial check on the limiting action (the elimination of the effects of amplitude modulation) of the Fig. 1 apparatus can be made by repeating the calibration curve at several levels of transmitter signal while the reference signal level is held constant.

It has previously been stated that the apparatus of Fig. 1 indicates phase deviation of one signal with respect to another. Therefore, the device of this invention may be used to measure absolute phase deviations (if the reference signal is invariant) or it may be used to measure the may be varying in phase.

The device of this invention (Fig. 1) indicates the average phase of the transmitter signal, the amount of phase deviation or phase modulation of the transmitter signal (this is determined from the trace on the calibrated oscilloscope 46), the wave form of the transmitter phase deviation (determined directly from the shape of the wave trace on the oscilloscope 46 when a suitable sweep is applied), and even the frequency of the transmitter phase deviation (this may be determined from the timing of one or more periods of the phase deviation or phase modulation wave relative phase relationship of two signals, each of which by the calibrated oscilloscope trace).

What is claimed is:

1. Apparatus for measuring phase modulation in the presence of amplitude modulation comprising a source of amplitude modulated waves the incidental phase modulation on which is to be measured, a source of reference frequency waves, a balanced phase detector including two input connections, means coupled to said input connections for providing a push-pull output from the signal applied to one of said input connections and a push-push output from the signal applied to the other of said input connections with negligible electrical coupling between the two applied signals, two rectifiers receptive respectively of different halves of said push-pull and push-push outputs, and two output connections respectively coupled to said rectifiers; means coupling waves from said modulated wave source to one of said input connections, means coupling waves from said reference frequency wave source to the other of said input connections, the amplitude of the waves coupled to said phase detector from said reference frequency wave source being lower than the amplitude of the waves coupled to said phase detector from said modulated wave source throughout the amplitude modulation cycle of the latter, and utilization means coupled to said detector output connections.

2. Apparatus for measuring phase modulation in the presence of amplitude modulation comprising a source of amplitude modulated waves the incidental phase modulation on which is to be measured, a source of reference frequency waves, a balanced phase detector including two input connections, means coupled to said input connections for providing a push-pull output from the signal applied to one of said input connections and a push-push output from the signal applied to the other of said input connections with negligible electrical coupling between the two applied signals, two rectifiers receptive respectively of different halves of said push-pull and push-push outputs, and a push-pull output circuit balanced with respect to a point of fixed reference potential coupled to said rectifiers; means coupling waves from said modulated wave source to one of said input connections, means coupling waves from said reference frequency wave source to the other of said input connections, the amplitude of the waves coupled to said phase detector from said reference frequency wave source being lower than the amplitude of the waves coupled to said phase detector from said modulated wave source throughout the amplitude modulation cycle of the latter, and a differential amplifier coupled to said push-pull output circuit, said amplifier being constructed and arranged to amplify only the push-pull signal appearing in said output circuit and to reject the push-push signal appearing therein.

3. Apparatus for measuring phase modulation in the presence of amplitude modulation comprising a source of amplitude modulated waves the incidental phase modulation on which is to be measured, a source of reference frequency waves, a balanced phase detector including two input connections, means coupled to said input connections for providing a push-pull output from the signal applied to one of said input connections and a push-push output from the signal applied to the other of said input connections with negligible electrical coupling between the two applied signals, two rectifiers receptive respectively of different halves of said push-pull and push-push outputs, and a push-pull output circuit balanced with respect to a point of fixed reference potential coupled to said rectifiers; means copling waves from said modulated wave source to one of said input connections, means coupling waves from said reference frequency wave source to the other of said input connections, the amplitude of the waves coupled to said phase detector from said reference frequency wave source being lower than the amplitude of the waves coupled to said phase detector from said modulated wave source throughout the amplitude modulation cycle of the latter, a differential amplifier coupled to said push-pull output circuit, said amplifier being constructed and arranged to amplify only the push-pull signal appearing in said output circuit and to reject the push-push signal appearing therein, and a voltage indicating device coupled to the output of said amplifier.

References Cited in the file of this patent

UNITED STATES PATENTS

| | | |
|---|---|---|
| 2,189,896 | Gutzman | Feb. 13, 1940 |
| 2,291,558 | Peterson | July 28, 1942 |
| 2,620,467 | Donal | Dec. 2, 1952 |